United States Patent
Gao et al.

(10) Patent No.: US 12,244,222 B2
(45) Date of Patent: Mar. 4, 2025

(54) POWER CONVERSION CIRCUIT, POWER TRANSMISSION SYSTEM, AND PHOTOVOLTAIC DEVICE

(71) Applicant: Huawei Digital Power Technologies Co., Ltd., Guangdong (CN)

(72) Inventors: Yongbing Gao, Shanghai (CN); Dong Chen, Shanghai (CN); Lei Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 180 days.

(21) Appl. No.: 18/162,524

(22) Filed: Jan. 31, 2023

(65) Prior Publication Data

US 2023/0170792 A1     Jun. 1, 2023

Related U.S. Application Data

(63) Continuation of application No. PCT/CN2020/106375, filed on Jul. 31, 2020.

(51) Int. Cl.
| | |
|---|---|
| *H02M 1/36* | (2007.01) |
| *H02M 1/44* | (2007.01) |
| *H02M 7/5387* | (2007.01) |
| *H02J 3/00* | (2006.01) |

(52) U.S. Cl.
CPC .............. *H02M 1/36* (2013.01); *H02M 1/44* (2013.01); *H02M 7/5387* (2013.01); *H02J 3/00* (2013.01); *H02J 2300/24* (2020.01)

(58) Field of Classification Search
CPC ......... H02M 1/36; H02M 1/44; H02M 7/5387
See application file for complete search history.

(56) References Cited

U.S. PATENT DOCUMENTS

| | | | | |
|---|---|---|---|---|
| 2011/0012579 A1* | 1/2011 | Huang | ................ | H02M 1/4208 323/304 |
| 2011/0260700 A1* | 10/2011 | Chen | ................... | H02M 1/4233 363/13 |

FOREIGN PATENT DOCUMENTS

CN          102545247 A       7/2012

\* cited by examiner

*Primary Examiner* — Adolf D Berhane
*Assistant Examiner* — Afework S Demisse

(57) ABSTRACT

Embodiments of this application provide a power conversion circuit, a power transmission system, and a photovoltaic device. The power conversion circuit includes: a first bridge arm, where the first bridge arm includes a first upper bridge arm and a first lower bridge arm; the first upper bridge arm includes a switching component connected between an input positive end and an output end; the first lower bridge arm includes a switching component connected between the output end and an input negative end; each of the switching components includes a switching transistor and a first diode anti-parallel connected to the switching transistor.

17 Claims, 12 Drawing Sheets

POWER CONVERSION CIRCUIT, POWER TRANSMISSION SYSTEM, AND PHOTOVOLTAIC DEVICE

CROSS-REFERENCE TO RELATED APPLICATIONS

This application is a continuation of International Application No. PCT/CN2020/106375, filed on Jul. 13, 2020, the disclosure of which is hereby incorporated by reference in its entirety.

TECHNICAL FIELD

This application relates to the field of power generation technologies, and in particular, to a power conversion circuit, a power transmission system, and a photovoltaic device.

BACKGROUND

Photovoltaic power generation is a technology for directly converting photon energy into electric energy based on a photovoltaic effect on a semiconductor interface. The photovoltaic power generation mainly relates to three parts: a solar panel/a photovoltaic panel, a controller, and an inverter. A main part consists of electronic parts and components. Solar cells are connected in series, and then are packaged for protection, to form a solar panel with a large area. Then, the solar panel and parts such as the controller and the inverter form a photovoltaic power generation device. A circuit of the existing photovoltaic device has a relatively low capability of bearing a large current that exceeds a specified threshold and that is caused due to a reason such as a short circuit or a lightning strike, causing a relatively high risk of damaging a component in the circuit. To prevent the component from being damaged, a response time of a fault protection apparatus for performing a protection function needs to be relatively short.

SUMMARY

This application provides a power conversion circuit, a power transmission system, and a photovoltaic device, to improve a capability of a circuit for bearing a current exceeding a specified threshold and reduce a risk of damaging a component, thereby implementing relatively high safety reliability, a simple structure, and a relatively small impact on an original circuit structure. In addition, a fault protection apparatus is allowed to have a larger response speed range. Therefore, the fault protection apparatus with a relatively long response time and a concise design may be used.

In view of this, the following technical solutions are used in embodiments of this application.

According to a first aspect, an embodiment of this application provides a power conversion circuit. The power conversion circuit includes a first bridge arm and a unilateral conduction component. The first bridge arm includes a first upper bridge arm and a first lower bridge arm. The first upper bridge arm includes a switching component connected between an input positive end and an output end. The first lower bridge arm includes a switching component connected between the output end and an input negative end. Each of the switching components includes a switching transistor and a first diode anti-parallel connected to the switching transistor. A first end of the switching transistor of the first upper bridge arm is connected to the input positive end, and a second end is connected to the output end. A first end of a switching transistor of the first lower bridge arm is connected to the output end, and a second end is connected to the input negative end. One or both of the first upper bridge arm and the first lower bridge arm is/are separately connected in parallel to the unilateral conduction component. A conduction direction of the unilateral conduction component is the same as a conduction direction of the first diode of the switching component of the first bridge arm, to at least divide an abnormal current flowing through the first diode when a fault occurs.

In the foregoing solution, because one or both of the first upper bridge arm and the first lower bridge arm is/are separately connected in parallel to the unilateral conduction component, the conduction direction of the unilateral conduction component is the same as the conduction direction of the first diode of the switching component of the first bridge arm. In this way, when the fault occurs (for example, a grounding fault occurs or a lightning strike occurs), the unilateral conduction component can divide the abnormal current (a current exceeding a specified threshold) flowing through the first diode, to improve a capability of a circuit for bearing the current exceeding the specified threshold and reduce a risk of damaging a component, thereby implementing relatively high safety reliability, a simple structure, and a relatively small impact on an original circuit structure. In addition, a fault protection apparatus is allowed to have a larger response speed range. Therefore, the fault protection apparatus with a relatively long response time and a concise design may be used.

In an embodiment, the unilateral conduction component includes one second diode or at least two second diodes. One group of switching components in switching components of one or both of the first upper bridge arm and the first lower bridge arm are connected in parallel to one group of second diodes. Each group of switching components include one switching component or at least two switching components that are connected in series. Each group of second diodes include one second diode or at least two second diodes that are connected in series.

In other words, in this implementation, the first upper bridge arm is used as an example for description. The switching component of the first upper bridge arm is connected in parallel to the unilateral conduction component. All switching components forming the first upper bridge arm may be one group. The entire first upper bridge arm is connected in parallel to the unilateral conduction component. Alternatively, each switching component of the first upper bridge arm may be one group. In this case, each switching component is connected in parallel to one unilateral conduction component. Alternatively, at least two consecutively arranged switching components of the first upper bridge arm may be one group. In this case, each group of switching components are connected in parallel to one unilateral conduction component, and quantities of groups of switching components of the first upper bridge arm may be the same or may be different. The unilateral conduction component may be one second diode or one group of second diodes that are connected in series.

In an embodiment, the power conversion circuit further includes a first filter inductor. The first filter inductor is connected between an output end of the first bridge arm and an output end of the power conversion circuit. One end of the unilateral conduction component is connected to the input positive end or the input negative end, and the other end is connected to the output end of the power conversion circuit.

In other words, in this implementation, two connection manners of the unilateral conduction component when the power conversion circuit includes the first filter inductor are described. When one end of the unilateral conduction component is connected to the input positive end, and the other end is connected to the output end of the power conversion circuit, the unilateral conduction component is connected in parallel to the first upper bridge arm and the first filter inductor that are connected in series. When one end of the unilateral conduction component is connected to the input negative end, and the other end is connected to the output end of the power conversion circuit, the unilateral conduction component is connected in parallel to the first lower bridge arm and the first filter inductor that are connected in series. The first filter inductor may perform a filtering operation on frequencies of a frequency band to perform functions of suppressing and preventing interference.

In an embodiment, the power conversion circuit further includes a second filter inductor. The second filter inductor is connected between the first filter inductor and the output end of the power conversion circuit. The other end of the unilateral conduction component is connected between the first filter inductor and the second filter inductor.

In other words, in this implementation, the power conversion circuit may further include the second filter inductor connected between the first filter inductor and the output end of the power conversion circuit. In this case, the other end of the unilateral conduction component is connected between the first filter inductor and the second filter inductor. The second filter inductor may perform a filtering operation to further perform functions of suppressing and preventing interference.

In an embodiment, the first bridge arm further includes a third inductor connected in series to the unilateral conduction component. One end of the third inductor is connected to the input negative end, and the other end is connected to an anode of the unilateral conduction component. Alternatively, one end of the third inductor is connected to the input positive end, and the other end is connected to a cathode of the unilateral conduction component.

In other words, in this implementation, the first lower bridge arm is used as an example for description. The first lower bridge arm is connected in series to the first filter inductor. One end of the third inductor is connected to the input negative end, and the other end is connected to one end of the unilateral conduction component (that is, an anode of the second diode). The other end of the unilateral conduction component (that is, a cathode of the second diode) is connected to the output end of the power conversion circuit. When a short-circuit current or a current when a device using the power conversion circuit is struck by lightning flows through the diode of the switching component of the first lower bridge arm and the unilateral conduction component, that is, the second diode, because the first lower bridge arm is connected to the first filter inductor having a specific impedance characteristic, the unilateral conduction component, that is, the second diode is connected to the third inductor having a specific impedance characteristic. In this way, the following case is avoided: Most of the current when the fault occurs flows through the second diode. In addition, a problem that the device becomes ineffective because the second diode is damaged due to an overcurrent is avoided.

In an embodiment, the power conversion circuit is three phases of circuits. The unilateral conduction components connected in parallel to the first upper bridge arms of the three phases of circuits are all connected to the same third inductor. Alternatively, the unilateral conduction components connected in parallel to the first lower bridge arms of the three phases of circuits are all connected to the same third inductor. In an implementation, alternatively, the unilateral conduction components connected in parallel to the first upper bridge arms of the three phases of circuits may be all connected to the same third inductor, and the unilateral conduction components connected in parallel to the first lower bridge arms of the three phases of circuits may be all connected to the same third inductor.

In other words, in this implementation, when the power conversion circuit is the three phases of circuits, the three phases of circuits of the first upper bridge arm may share one third inductor, and the three phases of circuits of the first lower bridge arm may share one third inductor. In comparison with a solution in which the three phases of circuits of the first upper bridge arm/the first lower bridge arm are respectively connected to the three inductors, a quantity of used third inductors may be reduced in the solution of this application.

In an embodiment, the first upper bridge arm includes a first switching component and a second switching component that are connected in series, and the first lower bridge arm includes a third switching component and a fourth switching component that are connected in series.

The first bridge arm further includes a fifth switching component and a sixth switching component. A first end of a switching transistor of the fifth switching component is connected between the first switching component and the second switching component. A second end of a switching transistor of the sixth switching component is connected between the third switching component and the fourth switching component. A second end of the switching transistor of the fifth switching component and a first end of the switching transistor of the sixth switching component are connected to an input reference end. In other words, a topology of the power conversion circuit is a circuit formed after a unilateral conduction component such as a diode is added on the basis of an active neutral point clamped three-level circuit. When the current exceeding the specified threshold (for example, a short-circuit current formed due to abnormal grounding) flows through the diode of the switching component of the first bridge arm, the unilateral conduction component divides the current. In other words, the current exceeding the specified threshold separately enters the diode of the switching component of the first bridge arm and the unilateral conduction component, to improve a capability of bearing a short-circuit current when the circuit is abnormally grounded.

Alternatively, the first bridge arm further includes a third diode and a fourth diode. A cathode of the third diode is connected between the first switching component and the second switching component. An anode of the fourth diode is connected between the third switching component and the fourth switching component. An anode of the third diode and a cathode of the fourth diode are connected to an input reference end. In other words, the power conversion circuit is a circuit formed after a unilateral conduction component such as a diode is added on the basis of a neutral point clamped three-level circuit. Similarly, a capability of the circuit for bearing the current exceeding the specified threshold can also be improved by using the circuit structure.

In an embodiment, the first bridge arm further includes a seventh switching component and an eighth switching component. A first end of a switching transistor of the seventh switching component is connected to the input reference end. A first end of a switching transistor of the eighth switching component is connected to the output end of the first bridge arm. A second end of the switching transistor of the seventh switching component is connected to a second end of the switching transistor of the eighth switching component. Alternatively, a second end of a switching transistor of the seventh switching component is connected to the input reference end. A second end of a switching transistor of the eighth switching component is connected to the output end of the first bridge arm. A first end of the switching transistor of the seventh switching component is connected to a first end of the switching transistor of the eighth switching component.

In other words, in this implementation, the power conversion circuit is a circuit formed after a unilateral conduction component such as a diode is added on the basis of a T-type three-level circuit. Because the unilateral conduction component such as a diode when a fault occurs can divide the abnormal current flowing through the first diode of the switching component of the first bridge arm, the capability of the circuit for bearing the current exceeding the specified threshold can be improved by using the circuit structure.

In an embodiment, the first bridge arm further includes a first capacitor and a second capacitor that are connected in series between the input positive end and the input negative end. The input reference end is located between the first capacitor and the second capacitor.

In an embodiment, the output end of the first bridge arm is an output live wire end. The power conversion circuit further includes a second bridge arm. The second bridge arm includes a second upper bridge arm and a second lower bridge arm. The second upper bridge arm includes another switching component connected between the input positive end and an output neutral wire end. The second lower bridge arm includes another switching component connected between the output neutral wire end and the input negative end. A first end of a switching transistor of the second upper bridge arm is connected to the input positive end, and a second end is connected to the output neutral wire end. A first end of a switching transistor of the second lower bridge arm is connected to the output neutral wire end, and a second end is connected to the input negative end.

In this implementation, there is a diode additionally connected in parallel to the first bridge arm connected to the output live wire end, and there is no diode additionally connected in parallel to the second bridge arm connected to the output neutral wire end. This is because the output neutral wire end and the ground are approximately equipotential. When this loop is abnormally grounded, because a voltage difference is relatively low, a relatively large short-circuit current is not generated. Therefore, a diode does not need to be additionally connected in parallel to the second bridge arm. Likewise, in another single phase of circuit or other three phases of circuits, a bridge arm connected to a neutral wire end may not be additionally connected in parallel to a diode. In other words, when an output end of a bridge arm of a bridge power conversion circuit is connected to a neutral wire, the bridge arm is not connected in parallel to a unilateral conduction component.

In an embodiment, the power conversion circuit further includes a ninth switching component and a tenth switching component. A first end of a switching transistor of the ninth switching component is connected to the output neutral wire end. A first end of a switching transistor of the tenth switching component is connected to the output live wire end. A second end of the switching transistor of the ninth switching component is connected to a second end of the switching transistor of the tenth switching component. Alternatively, a second end of a switching transistor of the ninth switching component is connected to the output neutral wire end. A second end of a switching transistor of the tenth switching component is connected to the output live wire end. A first end of the switching transistor of the ninth switching component is connected to a first end of the switching transistor of the tenth switching component.

In other words, in this implementation, the circuit is a single phase of a Heric circuit, including a first bridge arm, a second bridge arm, and a cross bridge arm. In addition, there is a diode additionally connected in parallel to the first bridge arm connected to the output live wire end, and there is no diode additionally connected in parallel to the second bridge arm connected to the output neutral wire end.

In an embodiment, the switching transistor is a metal oxide semiconductor field-effect transistor MOSFET. A first end of the switching transistor is a drain, and a second end of the switching transistor is a source. The first diode is a body diode of the metal oxide semiconductor field-effect transistor MOSFET. Alternatively, the switching transistor is an insulated gate bipolar transistor IGBT. A first end of the switching transistor is a collector, and a second end of the switching transistor is an emitter.

In an embodiment, the power conversion circuit further includes a step-up circuit. The step-up circuit includes a fourth inductor, a fifth diode, an eleventh switching component, and a third capacitor. An output positive end of the step-up circuit is connected to the input positive end of the first bridge arm, and an output negative end of the step-up circuit is connected to the input negative end of the first bridge arm. The third capacitor is connected to the output positive end and the output negative end of the step-up circuit.

One end of the fourth inductor is connected to an input positive end of the step-up circuit, and the other end is connected to an anode of the fifth diode. A cathode of the fifth diode is connected to the output positive end of the step-up circuit. A first end of a switching transistor of the eleventh switching component is connected between the fourth inductor and the fifth diode, and a second end is connected to the input negative end. The first lower bridge arm of the first bridge arm is connected in parallel to the unilateral conduction component. In other words, because the fifth diode is connected in reverse directions to a diode of the first switching component and a diode of the second switching component, a short-circuit loop is not formed, and therefore, no short-circuit current is generated. A diode of the third switching component and a diode of the fourth switching component may form a short-circuit loop. Therefore, the first lower bridge arm may be connected in parallel to the unilateral conduction component such as a diode. In this case, when the foregoing loop is formed, the unilateral conduction component shares a current in the diode of the third switching component and a current in the diode of the fourth switching component.

Alternatively, one end of the fourth inductor is connected to an input negative end of the step-up circuit, and the other end is connected to a cathode of the fifth diode. An anode of the fifth diode is connected to an output negative end of the step-up circuit. A first end of a switching transistor of the eleventh switching component is connected to the input positive end, and a second end is connected between the fourth inductor and the fifth diode. The first upper bridge arm of the first bridge arm is connected in parallel to the unilateral conduction component. In other words, when an external cable of the input negative end of the step-up circuit is accidentally short circuited to the ground, because the fifth diode is connected in reverse directions to a diode of the third switching component and a diode of the fourth switching component, a short-circuit loop is not formed, and therefore, no short-circuit current is generated. An input positive end of an inverter circuit is directly electrically connected to the output positive end and the input positive end of the step-up circuit. A diode of the first switching component and a diode of the second switching component form a short-circuit loop. Therefore, the first upper bridge arm may be connected in parallel to the unilateral conduction component such as a diode. In this case, when the foregoing loop is formed, the unilateral conduction component shares a current in the diode of the first switching component and a current in the diode of the second switching component.

According to a second aspect, an embodiment of this application provides a power transmission system. The power transmission system includes a fault protection apparatus and the power conversion circuit in the first aspect. The fault protection apparatus is coupled to an output end of the power conversion circuit. An input positive end and an input negative end of the power conversion circuit are configured to connect to a device providing power. The fault protection apparatus is configured to disconnect a circuit when the power conversion circuit is faulty.

In the foregoing solution, because the power transmission system includes the foregoing power conversion circuit, the power transmission system has all or at least some of advantages of the foregoing power conversion circuit, to improve a capability of a circuit for bearing a current exceeding a specified threshold and reduce a risk of damaging a component, thereby implementing relatively high safety reliability, a simple structure, and a relatively small impact on an original circuit structure. In addition, the fault protection apparatus is allowed to have a larger response speed range. Therefore, the fault protection apparatus with a relatively long response time and a concise design may be used.

In an embodiment, the fault protection apparatus includes a sampling detection unit and a protection execution unit. The protection execution unit is connected to an output end of the power conversion circuit by using a connection conductor. The sampling detection unit includes a sampling unit coupled to the connection conductor and a detection unit connected to the sampling unit. The detection unit is connected to the protection execution unit. When the detection unit detects an abnormal current in the connection conductor, the protection execution unit is controlled to disconnect the circuit.

In this implementation, because a capability of the circuit for bearing short-circuit current when the circuit is abnormally grounded is improved, the sampling unit of the fault protection apparatus is allowed to use a component with a relatively long sampling detection delay time. The protection execution unit may use a mechanical switching component or a semiconductor switching component with a relatively long circuit disconnection time, thereby lowering a response time requirement for the component and simplifying a circuit design.

In an embodiment, the fault protection apparatus disconnects the circuit at a zero crossing point of the current.

In this implementation, the fault protection apparatus may disconnect the circuit at the zero crossing point of the current. In comparison with a solution of disconnecting the circuit at a point with a relatively large current, this solution may lower a risk of damaging the fault protection apparatus.

According to a third aspect, an embodiment of this application provides a photovoltaic device. The photovoltaic device includes an alternating-current power grid, a photovoltaic panel serving as a device providing power, and the power transmission system according to the foregoing second aspect. An input positive end of a power conversion circuit of the power transmission system is connected to a positive electrode of the photovoltaic panel. An input negative end of the power conversion circuit is connected to a negative electrode of the photovoltaic panel. The alternating-current power grid is connected to the fault protection apparatus. The alternating-current power grid is grounded.

The embodiments of this application provide the power conversion circuit, the power transmission system, and the photovoltaic device. Because one or both of the first upper bridge arm and the first lower bridge arm is/are separately connected in parallel to the unilateral conduction component, the conduction direction of the unilateral conduction component is the same as the conduction direction of the first diode of the switching component of the first bridge arm. In this way, when a fault occurs (for example, a grounding fault occurs or a lightning strike occurs), the unilateral conduction component can at least divide the abnormal current (the current exceeding the specified threshold) flowing through the first diode, to improve the capability of the circuit for bearing the current exceeding the specified threshold and reduce a risk of damaging a component, thereby implementing relatively high safety reliability, a simple structure, and a relatively small impact on an original circuit structure. In addition, the fault protection apparatus is allowed to have a larger response speed range. Therefore, the fault protection apparatus with a relatively long response time and a concise design may be used.

Other features and advantages of the present disclosure are described in detail in the following embodiments.

BRIEF DESCRIPTION OF DRAWINGS

The following briefly describes the accompanying drawings used in describing the embodiments or the conventional technologies.

DESCRIPTION OF EMBODIMENTS

The following describes technical solutions in embodiments of this application with reference to accompanying drawings in embodiments of this application.

An electrical device generally includes a cable for transmitting power and a ground cable for providing safety protection. In an installation and operation process of an actual electrical device, abnormal grounding may occur due to natural or man-made factors, to form an additional loop and circulate a current, which poses a danger to the electrical device or a related person. Therefore, a fault protection apparatus that can effectively detect an abnormal grounding condition of a device and perform a protection operation needs to be disposed, to provide a safety guarantee for the electrical device and the related personnel.

Figure 1:
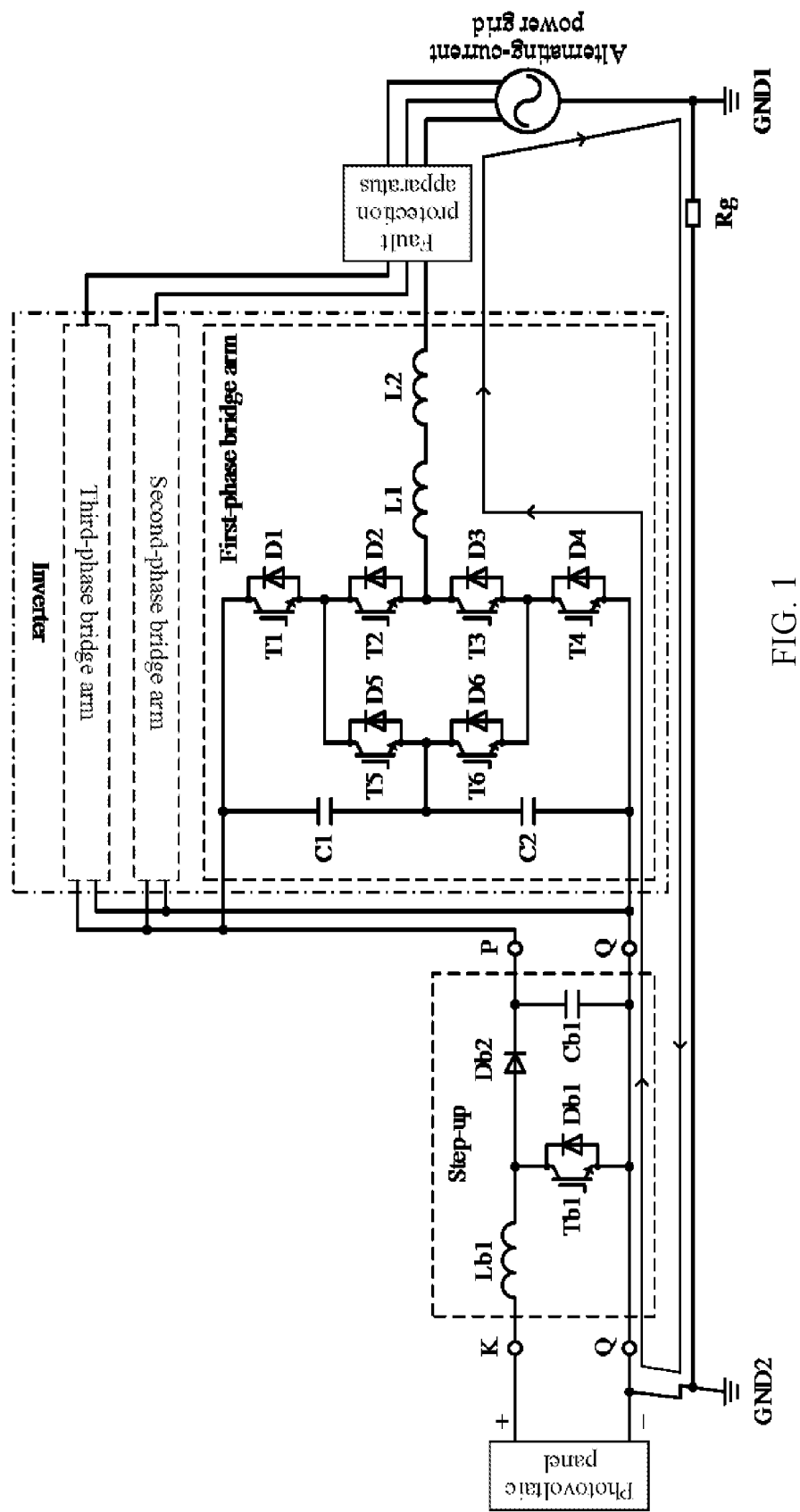
FIG. 1 is a schematic diagram of a structure of a photovoltaic device.

FIG. 1 is a schematic diagram of a structure of a photovoltaic device. As shown in FIG. 1, the photovoltaic device includes a photovoltaic panel, an alternating-current power grid, and a power transmission system located between the photovoltaic panel and the alternating-current power grid. The power transmission system includes a step-up circuit, an inverter circuit, and a fault protection apparatus. The step-up circuit includes a step-up inductor Lb1, a passive diode Db2, an output capacitor Cb1, an active transistor Tb1 (such as an IGBT), and a diode Db1 anti-parallel connected to the active transistor Tb1. The inverter circuit may be three phases of circuits including three bridge arms or a single phase of circuit including two bridge arms. In FIG. 1, the three phases of circuits are used as an example, and only a circuit topology of a first-phase bridge arm is simplified and shown. A topology of each bridge arm circuit of the inverter circuit may include two input capacitors: C1 and C2 that are connected in series, six active transistors: T1 to T6, diodes: D1 to D6 anti-parallel connected to the six active transistors, and two output inductors: L1 and L2 that are connected in series. It can be learned from FIG. 1 that the bridge arm circuit is an active neutral point clamped three-level circuit.

Further, an input positive end K of the step-up circuit is connected to a positive electrode of the photovoltaic panel, an input negative end Q of the step-up circuit is connected to a negative electrode of the photovoltaic panel, an output positive end of the step-up circuit is connected to an input positive end P of the inverter circuit, and an output negative end and the input negative end Q of the step-up circuit are directly electrically connected and then connected to an input negative end of the inverter circuit. An output end of the inverter circuit is connected to the alternating-current power grid through the fault protection apparatus. In this way, when the system is abnormally grounded, the fault protection apparatus provides a protection function.

When a cable of the input negative end Q (connected to the negative electrode of the photovoltaic panel) of the step-up circuit is accidentally short circuited to the ground, for example, the input negative end Q of the step-up circuit is connected to the ground (for example, GND2), and a voltage of the alternating-current power grid corresponding to a bridge arm of the inverter circuit is a negative value, the point short circuited to the ground (for example, GND2), the input negative end Q of the step-up circuit, the output negative end of the step-up circuit, the input negative end of the inverter circuit, the diode D4, the diode D3, the inductor L1, the inductor L2, a power grid access point, a power grid grounding point (for example, GND1), an earth resistance Rg, and then the point short circuited to the ground (for example, GND2) form a short-circuit loop shown by using a line with an arrowhead in FIG. 1. In addition, a current flows through the loop. The diodes: D3 and D4 in the inverter circuit are generally optimized and designed according to a power conversion requirement. For example, a current that is allowed to pass through the diodes: D3 and D4 are greater than a current required for normal work, but the current that is allowed to pass through the diodes: D3 and D4 are generally less than a short-circuit current. Therefore, the diodes have a relatively low capability of bearing the short-circuit current. If the fault protection apparatus needs a relatively long response time to perform the protection function, the diodes: D3 and D4 may be damaged due to an overcurrent, resulting in ineffectiveness of the device. Therefore, to prevent the component from being damaged, the fault protection apparatus needs a relatively short response time to perform the protection function. When a cable of the input positive end K (connected to the positive electrode of the photovoltaic panel) of the step-up circuit is abnormally grounded, the step-up diode Db2 is connected in reverse directions to the diodes: D1 and D2. Therefore, a short-circuit loop is not formed.

For the foregoing device including the fault protection apparatus, when an abnormal grounding condition occurs, there is still a risk that a component becomes ineffective due to an overcurrent because the protection is not implemented in time, or the fault protection apparatus is required to have a relatively short response time for performing the protection function. This application provides a power conversion circuit, a power transmission system, and a photovoltaic device, to improve a capability of a circuit for bearing a current exceeding a specified threshold and reduce a risk of damaging a component, thereby implementing relatively high safety reliability, a simple structure, and a relatively small impact on an original circuit structure. In addition, the fault protection apparatus is allowed to have a larger response speed range. Therefore, the fault protection apparatus with a relatively long response time and a concise design may be used.

Figure 2:
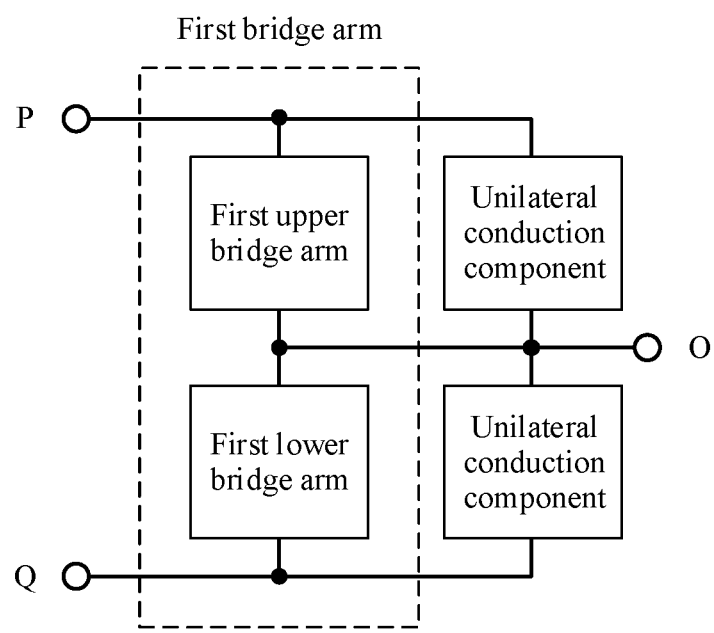
FIG. 2 is a schematic diagram of a structure of a power conversion circuit according to a first embodiment of this application.

FIG. 2 is a schematic diagram of a structure of a power conversion circuit according to a first embodiment of this application. As shown in FIG. 2, the power conversion circuit includes a first bridge arm and a unilateral conduction component. The first bridge arm includes a first upper bridge arm and a first lower bridge arm. The first upper bridge arm includes a switching component connected between an input positive end P and an output end O. The first lower bridge arm includes a switching component connected between the output end O and an input negative end Q. Each of the switching components includes a switching transistor and a first diode anti-parallel connected to the switching transistor. One or both of the first upper bridge arm and the first lower bridge arm is/are separately connected in parallel to the unilateral conduction component. In addition, a conduction direction of the unilateral conduction component is the same as a conduction direction of the first diode of the switching component of the first bridge arm, so that an abnormal current such as a current exceeding a specified threshold flowing through the first diode is divided at least when a fault occurs.

The first bridge arm may be used as an inverter circuit. The "abnormal current" may be, for example, a short-circuit current or a current when a device using the power conversion circuit is struck by lightning. These currents may exceed the specified threshold. The specified threshold of the current is usually set according to a bearing capability of the first diode, for example, set to two times a rated working current. In addition, the switching component is a component that includes a fully controlled switching transistor (referred to as a switching transistor for short) and an anti-parallel connected diode. The switching transistor may be a metal oxide semiconductor field-effect transistor MOSFET. In this case, a first end of the switching transistor is a drain, and a second end of the switching transistor is a source. The first diode is a body diode of the metal oxide semiconductor field-effect transistor MOSFET. Alternatively, the switching transistor is an insulated gate bipolar transistor IGBT. In this case, a first end of the switching transistor is a collector, and a second end of the switching transistor is an emitter. The first diode is an external anti-parallel connected diode of the insulated gate bipolar transistor IGBT. In the following, description is usually provided by using an example in which the switching transistor is the insulated gate bipolar transistor IGBT. In addition, conduction and disconnection of the switching component described in this application indicate conduction and disconnection of the switching transistor in the switching component. The unilateral conduction component may include one second diode or at least two second diodes. In addition, a withstanding voltage level, a current level, and a short-circuit current capability of the second diode are the same as or different from a withstanding voltage level, a current level, and a short-circuit current capability of the first diode that is of the first bridge arm and that is connected in parallel to the second diode. In addition, a package of the unilateral conduction component is the same as or different from a package of the first diode that is of the first bridge arm and that is connected in parallel to the unilateral conduction component. Selection may be performed according to a working requirement.

When the unilateral conduction component includes one second diode or at least two second diodes, one group of switching components in switching components of one or both of the first upper bridge arm and the first lower bridge arm are connected in parallel to one group of second diodes. Each group of switching components include one switching component or at least two switching components that are connected in series. Each group of second diodes include one second diode or at least two second diodes that are connected in series. The following is described in detail by using an example in which the first upper bridge arm is connected in parallel to the unilateral conduction component. In this case, there may be but is not limited to the following three cases:

First Case

The unilateral conduction component is connected in parallel to the entire first upper bridge arm. In this case, the unilateral conduction component may include one second diode or at least two second diodes that are connected in series. The first upper bridge arm may include one switching component or at least two switching components that are connected in series. In other words, all switching components of the first upper bridge arm are one group, and all second diodes that are connected in parallel to the first upper bridge arm and that are used as the unilateral conduction component are one group.

Second Case

Each of the switching components of the first upper bridge arm is separately connected in parallel to one second diode or connected in parallel to at least two second diodes that are connected in series. In other words, each switching component of the first upper bridge arm is separately one group, and the second diode that is connected in parallel to each switching component of the first upper bridge arm and that is used as the unilateral conduction component is one group and may include one second diode or at least two second diodes that are connected in series.

Third Case

The first upper bridge arm includes a plurality of switching components. The plurality of switching components may be grouped in an arrangement direction. Each group may separately include one switching component, two switching components, or more switching components. Each group of switching components are separately connected in parallel to one second diode or connected in parallel to at least two second diodes that are connected in series.

Figure 3:
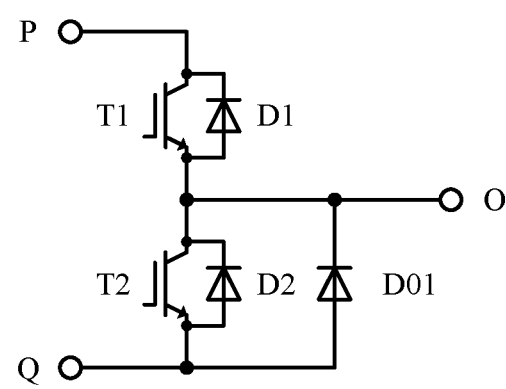
FIG. 3 is a schematic diagram of a circuit structure in an embodiment of the power conversion circuit shown in FIG. 2.

FIG. 3 is a schematic diagram of a circuit structure of an embodiment of the power conversion circuit shown in FIG. 2. As shown in FIG. 3, the first upper bridge arm includes one switching component T1/D1 connected between the input positive end P and the output end O, and the first lower bridge arm includes one switching component T2/D2 connected between the output end O and the input negative end Q. The switching transistor Ti is anti-parallel connected to the diode D1, and the switching transistor T2 is anti-parallel connected to the diode D2. A first end/A collector of the switching transistor T1 of the first upper bridge arm is connected to the input positive end P, and a second end/an emitter is connected to the output end O. A first end/A collector of the switching transistor T2 of the first lower bridge arm is connected to the output end O, and a second end/an emitter is connected to the input negative end Q. The first lower bridge arm is connected in parallel to the unilateral conduction component such as a diode D01. In addition, a conduction direction of the diode D01 is the same as a conduction direction of the diode D2 of the parallel switching component T2/D2. In other words, an anode of the diode D01 is connected to the input negative end Q, and a cathode is connected to the output end O. When an external cable connected to the input negative end Q of the circuit is accidentally short circuited to the ground, or the input negative end Q of the circuit is accidentally connected to a device grounding point through a line with a relatively low impedance, a short-circuit current flows through both the diode D2 and the diode D01, to reduce the short-circuit current that the diode D2 originally needs to bear, thereby reducing a risk of damaging the component. The "device grounding point" may be, for example, a metal housing of the device. The metal housing needs to be grounded to provide a personal protection function. The input negative end Q of the circuit is grounded when being connected to the metal housing. In addition, it may be understood that, if necessary, the diode serving as the unilateral conduction component may be connected in parallel to the first upper bridge arm. The cathode of the diode is connected to the input positive end P, and the anode is connected to the output end O. Alternatively, according to a working requirement, the first upper bridge arm may be connected in parallel to the unilateral conduction component, and the first lower bridge arm may be connected in parallel to the unilateral conduction component.

In the foregoing technical solution, because one or both of the first upper bridge arm and the first lower bridge arm is/are separately connected in parallel to the unilateral conduction component, the conduction direction of the unilateral conduction component is the same as the conduction direction of the first diode of the switching component of the first bridge arm. In this way, when the fault occurs (for example, a grounding fault occurs or a lightning strike occurs), the unilateral conduction component can at least divide the abnormal current (the current exceeding the specified threshold) flowing through the first diode, to improve a capability of a circuit for bearing the current exceeding the specified threshold and reduce a risk of damaging a component, thereby implementing relatively high safety reliability, a simple structure, and a relatively small impact on an original circuit structure. In addition, the fault protection apparatus is allowed to have a larger response speed range. Therefore, the fault protection apparatus with a concise design may be used.

Figure 4:
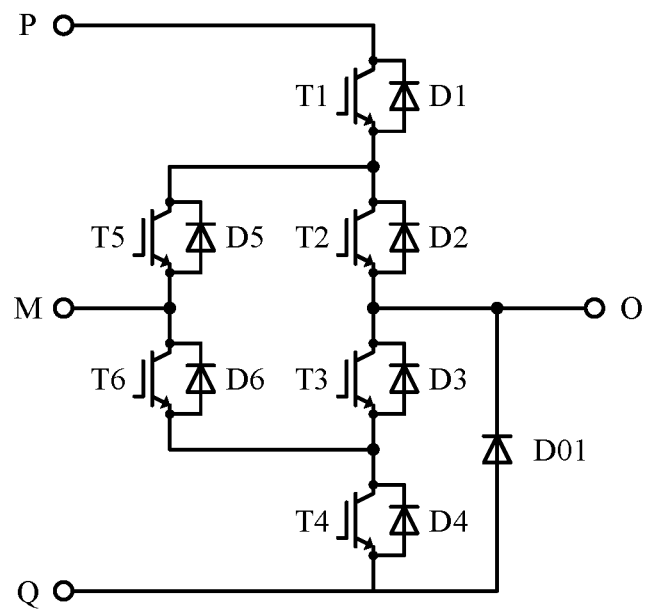
FIG. 4 is a schematic diagram of a structure of a power conversion circuit according to a second embodiment of this application.

FIG. 4 is a schematic diagram of a structure of a power conversion circuit according to a second embodiment of this application. As shown in FIG. 4, in a circuit topology of the first bridge arm in this embodiment, the first upper bridge arm includes a first switching component T1/D1 and a second switching component T2/D2 that are connected in series, and the first lower bridge arm includes a third switching component T3/D3 and a fourth switching component T4/D4 that are connected in series. A second diode D01 serving as a unilateral conduction component is connected in parallel to the third switching component T3/D3 and the fourth switching component T4/D4. The first bridge arm further includes an external bridge arm. The external bridge arm includes, for example, a fifth switching component T5/D5 and a sixth switching component T6/D6. A first end of a switching transistor T5 of the fifth switching component T5/D5 is connected to a first node between the first switching component T1/D1 and the second switching component T2/D2. A second end of a switching transistor T6 of the sixth switching component T6/D6 is connected to a second node between the third switching component T3/D3 and the fourth switching component T4/D4. A second end of the switching transistor T5 of the fifth switching component T5/D5 and a first end of the switching transistor T6 of the sixth switching component T6/D6 are connected to an input reference end M. In addition, at least two fifth switching components T5/D5 may be connected in series between the first node and the input reference end M, and at least two sixth switching components T6/D6 may be connected in series between the input reference end M and the second node.

It should be noted that a topology of the power conversion circuit shown in FIG. 4 is a circuit formed after a unilateral conduction component such as a diode D01 is added on the basis of an active neutral point clamped three-level circuit. In addition, according to a control method of the active neutral point clamped three-level circuit, the switching transistor T6 and the diode D3 are conducted in the original circuit. In this case, the diode D01 does not participate in work of the diode D3, that is, only the diode D3 performs an on, a conduction, and an off operation, to ensure original performance of the circuit. When the current exceeding the specified threshold (for example, a short-circuit current formed due to abnormal grounding) flows through the diode D3 and the diode D4, the diode D01 divides the current. In other words, the current exceeding the specified threshold separately flows through the diode D01, the diode D3, and the diode D4, thereby improving a capability of bearing the short-circuit current when the circuit is abnormally grounded.

Figure 5:
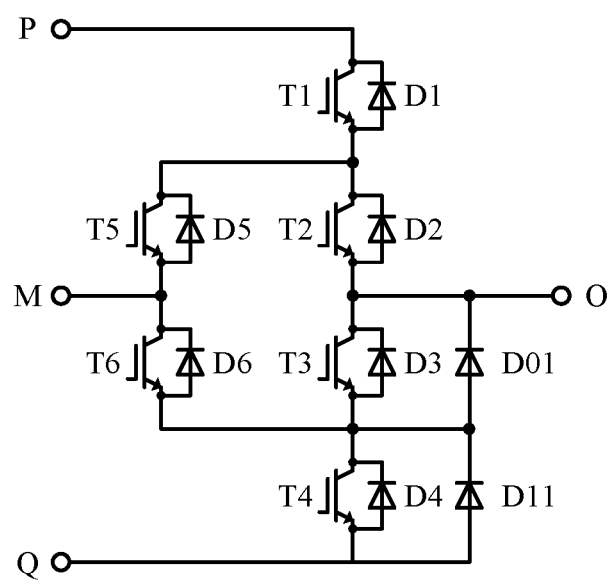
FIG. 5 is a schematic diagram of a structure of a power conversion circuit according to a third embodiment of this application.

FIG. 5 is a schematic diagram of a structure of a power conversion circuit according to a third embodiment of this application. A difference from the power conversion circuit shown in FIG. 4 is that the unilateral conduction component includes two second diodes: D01 and D11, the second diode D01 is connected in parallel to the third switching component T3/D3, and the second diode D11 is connected in parallel to the fourth switching component T4/D4. A cathode of the second diode D01 is connected to the output end O, and an anode is connected to a cathode of the second diode D11 and an intermediate node of the switching transistors: T3 and T4 that are connected in series. An anode of the second diode D11 is connected to the input negative end Q. In comparison with the power conversion circuit in the third embodiment shown in FIG. 4, the power conversion circuit shown in FIG. 5 is obtained after diodes are respectively additionally connected in parallel to the original diodes D3 and D4. In this way, a capability of the circuit for bearing the current exceeding the specified threshold can be improved. In addition, a circuit connection relationship is not changed in this case, to relatively simple and fast implement the circuit.

Figure 6:
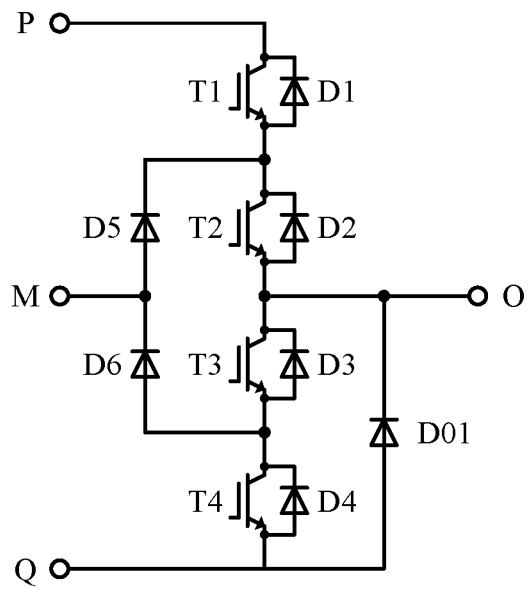
FIG. 6 is a schematic diagram of a structure of a power conversion circuit according to a fourth embodiment of this application.

FIG. 6 is a schematic diagram of a structure of a power conversion circuit according to a fourth embodiment of this application. A difference from the power conversion circuit shown in FIG. 4 is that the fifth switching component T5/D5 is replaced with a third diode D5, and the sixth switching component T6/D6 is replaced with a fourth diode D6. As shown in FIG. 6, in a circuit topology of the first bridge arm, the external bridge arm may include the third diode D5 and the fourth diode D6. A cathode of the third diode D5 is connected to a first node between the first switching component T1/D1 and the second switching component T2/D2. An anode of the fourth diode D6 is connected to a second node between the third switching component T3/D3 and the fourth switching component T4/D4. An anode of the third diode D5 and a cathode of the fourth diode D6 are connected to the input reference end M. In addition, at least two third diodes D5 may be connected in series between the first node and the input reference end M, and at least two fourth diodes D6 may be connected in series between the input reference end M and the second node. In other words, the power conversion circuit in FIG. 6 is a circuit formed after a unilateral conduction component such as a diode D01 is added on the basis of a neutral point clamped three-level circuit. A capability of the circuit for bearing the current exceeding the specified threshold can be improved by using the circuit structure.

Figure 7:
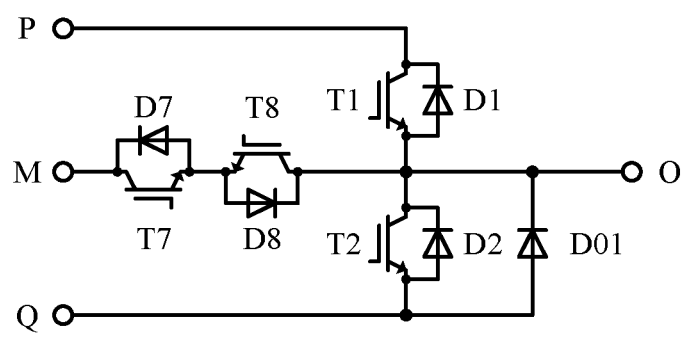
FIG. 7 is a schematic diagram of a structure of a power conversion circuit according to a fifth embodiment of this application.

FIG. 7 is a schematic diagram of a structure of a power conversion circuit according to a fifth embodiment of this application. As shown in FIG. 7, a circuit topology of the first bridge arm in this embodiment further includes a cross bridge arm. The cross bridge arm includes, for example, a seventh switching component T7/D7 and an eighth switching component T8/D8. A first end of a switching transistor T7 of the seventh switching component T7/D7 is connected to the input reference end M. A first end of a switching transistor T8 of the eighth switching component T8/D8 is connected to the output end O of the first bridge arm. A second end of the switching transistor T7 of the seventh switching component T7/D7 is connected to a second end of the switching transistor T8 of the eighth switching component T8/D8. In this case, an anode of a diode D7 of the seventh switching component T7/D7 is connected in reverse directions to an anode of a diode D8 of the eighth switching component T8/D8. Alternatively, a second end of a switching transistor T7 of the seventh switching component T7/D7 is connected to the input reference end M. A second end of a switching transistor T8 of the eighth switching component T8/D8 is connected to the output end O of the first bridge arm. A first end of the switching transistor T7 of the seventh switching component T7/D7 is connected to a first end of the switching transistor T8 of the eighth switching component T8/D8. In this case, a cathode of a diode D7 of the seventh switching component T7/D7 is connected in reverse directions to a cathode of a diode D8 of the eighth switching component T8/D8. In other words, the power conversion circuit in FIG. 7 is a circuit formed after a unilateral conduction component such as a diode D01 is added on the basis of a T-type three-level circuit. A capability of the circuit for bearing the current exceeding the specified threshold can be improved by using the circuit structure.

Figure 8:
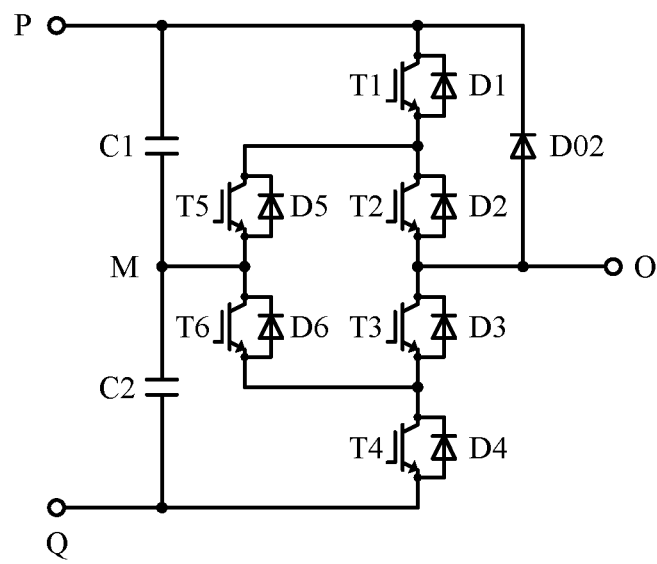
FIG. 8 is a schematic diagram of a structure of a power conversion circuit according to a sixth embodiment of this application.

FIG. 8 is a schematic diagram of a structure of a power conversion circuit according to a sixth embodiment of this application. As shown in FIG. 8, a difference from the power conversion circuit shown in FIG. 4 is that the first upper bridge arm is connected in parallel to a diode D02, and the power conversion circuit may further include a first capacitor C1 and a second capacitor C2 that are connected in series between the input positive end P and the input negative end Q, and the input reference end M is located between the first capacitor C1 and the second capacitor C2. It may be understood that the first capacitor C1 and the second capacitor C2 may also be disposed in the power conversion circuits shown in FIG. 4 to FIG. 7.

Figure 9:
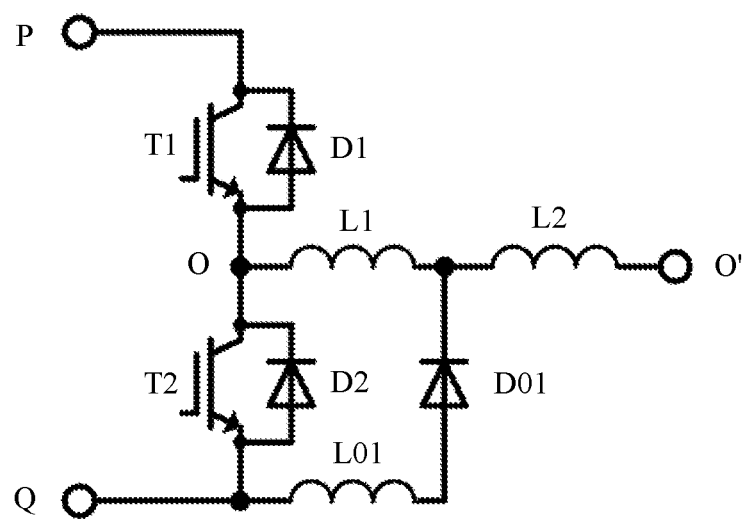
FIG. 9 is a schematic diagram of a structure of a power conversion circuit according to a seventh embodiment of this application.

FIG. 9 is a schematic diagram of a structure of a power conversion circuit according to a seventh embodiment of this application. As shown in FIG. 9, based on the power conversion circuit shown in FIG. 3, the power conversion circuit may further include a first filter inductor L1. The first filter inductor L1 is connected between the output end O of the first bridge arm and an output end O' of the power conversion circuit. The output end O of the first bridge arm is a node between the first upper bridge arm such as the switching component T1/D1 and the first lower bridge arm such as the switching component T2/D2. One end of the unilateral conduction component such as the diode D01 is connected to the input positive end P or the input negative end Q, and the other end is connected to the output end O' of the power conversion circuit. The other end of the unilateral conduction component such as the diode D01 may be connected to the other end that is of the first filter inductor L1 and that is away from the output end O of the first bridge arm. FIG. 9 shows only one first filter inductor L1. It may be understood that there may be at least two first filter inductors L1 connected to the output end O of the first bridge arm, and the other end of the unilateral conduction component such as the diode D01 is connected to the other end that is of at least two first filter inductors L1 and that is away from the output end O of the first bridge arm.

In addition, the power conversion circuit may further include a second filter inductor L2. The second filter inductor L2 is connected between the first filter inductor L1 and the output end O' of the power conversion circuit. The other end of the unilateral conduction component such as the diode D01 is connected between the first filter inductor L1 and the second filter inductor L2. FIG. 9 shows only one second filter inductor L2. It may be understood that there may be at least two second filter inductors L2.

Still with reference to FIG. 9, the power conversion circuit further includes a third inductor L01 connected in series to the unilateral conduction component such as a diode D01. One end of the third inductor L01 is connected to the input negative end Q, and the other end is connected to an anode of the unilateral conduction component such as the diode D01. In other words, in this case, the third inductor L01 and the unilateral conduction component such as the diode D01 that are connected in series are connected in parallel to the first lower bridge arm such as the switching component T2/D2. In addition, to reduce the costs, when the power conversion circuit is three phases of circuits, unilateral conduction components connected in parallel to first lower bridge arms of the three phases of circuits are all connected to the same third inductor L01. In addition, the third inductor L01 may also be connected to a cathode of the unilateral conduction component such as the diode D01. In other words, one end of the third inductor L01 is connected to the cathode of the diode D01, and the other end is connected to a node between the first filter inductor L1 and the second filter inductor L2.

Alternatively, one end of the third inductor L01 is connected to the input positive end P, and the other end is connected to a cathode of the unilateral conduction component. In other words, in this case, the third inductor L01 and the unilateral conduction component such as the diode D02 (with reference to FIG. 8) that are connected in series are connected in parallel to the first upper bridge arm. In addition, to reduce the costs, when the power conversion circuit is three phases of circuits, unilateral conduction components connected in parallel to first upper bridge arms of the three phases of circuits are all connected to the same third inductor L01. In addition, the third inductor L01 may also be connected to the anode of the unilateral conduction component such as the diode D02. In other words, one end of the third inductor L01 is connected to the anode of the diode D02 (with reference to FIG. 8), and the other end is connected to a node between the first filter inductor L1 and the second filter inductor L2 (with reference to FIG. 9).

Still with reference to FIG. 9, when a short-circuit current or a current when a device using the power conversion circuit is struck by lightning flows through the first diode D2 and the second diode D01, because the first diode is connected to the first filter inductor L1 with a specific impedance characteristic, the second diode D01 is connected to the third inductor L01 with a specific impedance characteristic. In this way, the following case is avoided: Most of the current when the fault occurs flows through the second diode D01. In addition, a problem that the device becomes ineffective because the second diode D01 is damaged due to an overcurrent is avoided.

Figure 10:
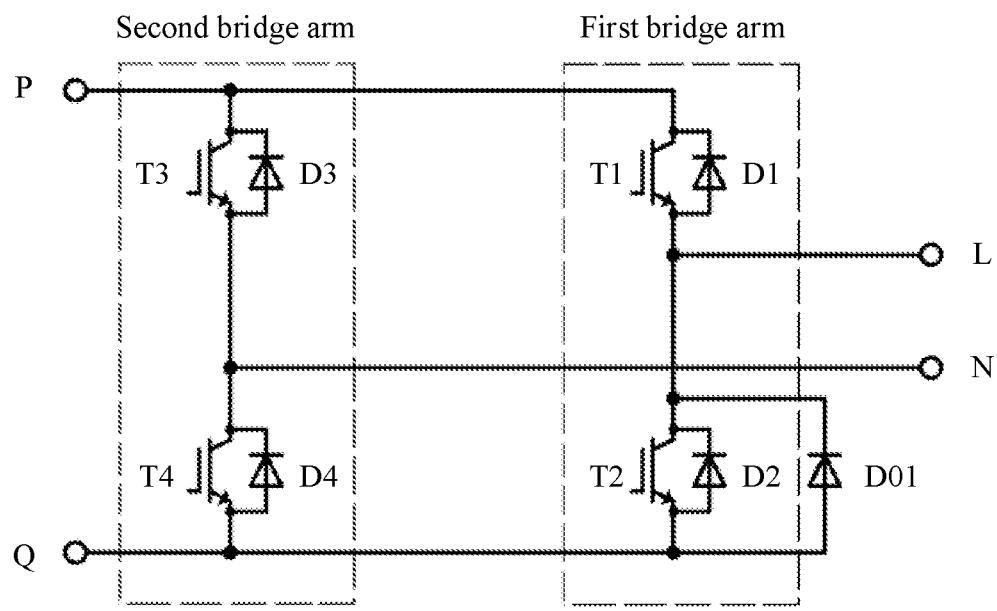
FIG. 10 is a schematic diagram of a structure of a power conversion circuit according to an eighth embodiment of this application.

FIG. 10 is a schematic diagram of a structure of a power conversion circuit according to an eighth embodiment of this application. As shown in FIG. 10, the output end of the first bridge arm is an output live wire end L, the first upper bridge arm includes one switching component T1/D1 connected between the input positive end P and the output live wire end L, and the first lower bridge arm includes one switching component T2/D2 connected between the output live wire end L and the input negative end Q. The power conversion circuit further includes a second bridge arm. The second bridge arm includes a second upper bridge arm and a second lower bridge arm. The second upper bridge arm includes another switching component such as T3/D3 connected between the input positive end P and an output neutral wire end N. The second lower bridge arm includes another switching component such as T4/D4 connected between the output neutral wire end N and the input negative end Q. A first end of a switching transistor such as T3 of the second upper bridge arm is connected to the input positive end P, and a second end is connected to the output neutral wire end N. A first end of a switching transistor such as T4 of the second lower bridge arm is connected to the output neutral wire end N, and a second end is connected to the input negative end Q. In this case, a diode may be additionally connected in parallel to the first lower bridge arm of the first bridge arm. Certainly, if necessary, a diode may be additionally connected in parallel to the first upper bridge arm of the first bridge arm.

Figure 11:
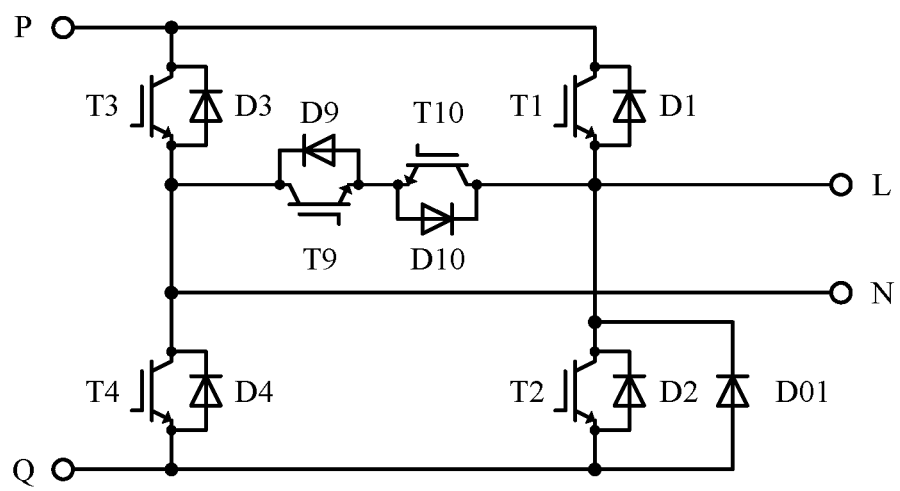
FIG. 11 is a schematic diagram of a structure of a power conversion circuit according to a ninth embodiment of this application.

FIG. 11 is a schematic diagram of a structure of a power conversion circuit according to a ninth embodiment of this application. As shown in FIG. 11, based on the power conversion circuit shown in FIG. 10, the power conversion circuit further includes a cross bridge arm. The cross bridge arm includes, for example, a ninth switching component T9/D9 and a tenth switching component T10/D10. A first end of a switching transistor T9 of the ninth switching component T9/D9 is connected to an output neural wire end N. A first end of a switching transistor T10 of the tenth switching component T10/D10 is connected to the output live wire end L. A second end of the switching transistor T9 of the ninth switching component T9/D9 is connected to a second end of the switching transistor T10 of the tenth switching component T10/D10. Alternatively, a second end of a switching transistor T9 of the ninth switching component T9/D9 is connected to an output neural wire end N. A second end of a switching transistor T10 of the tenth switching component T10/D10 is connected to the output live wire end L. A first end of the switching transistor T9 of the ninth switching component T9/D9 is connected to a first end of the switching transistor T10 of the tenth switching component T10/D10. In other words, the circuit shown in FIG. 11 is a single phase of Heric circuit, including a first bridge arm, a second bridge arm, and a cross bridge arm.

In the circuit topologies shown in FIG. 10 and FIG. 11, there is a diode additionally connected in parallel to the first bridge arm connected to the output live wire end L, and there is no diode additionally connected in parallel to the second bridge arm connected to the output neutral wire end N. This is because the output neutral wire end N and the ground are approximately equipotential. When this loop is abnormally grounded, because a voltage difference is relatively low, a relatively large short-circuit current is not generated. Therefore, a diode does not need to be additionally connected in parallel to the second bridge arm. Likewise, in another single phase of circuit or other three phases of circuits, a bridge arm connected to a neutral wire end may not be additionally connected in parallel to a diode. In other words, when an output end of a bridge arm of a bridge power conversion circuit is connected to a neutral wire, the bridge arm is not connected in parallel to a unilateral conduction component.

Figure 12:
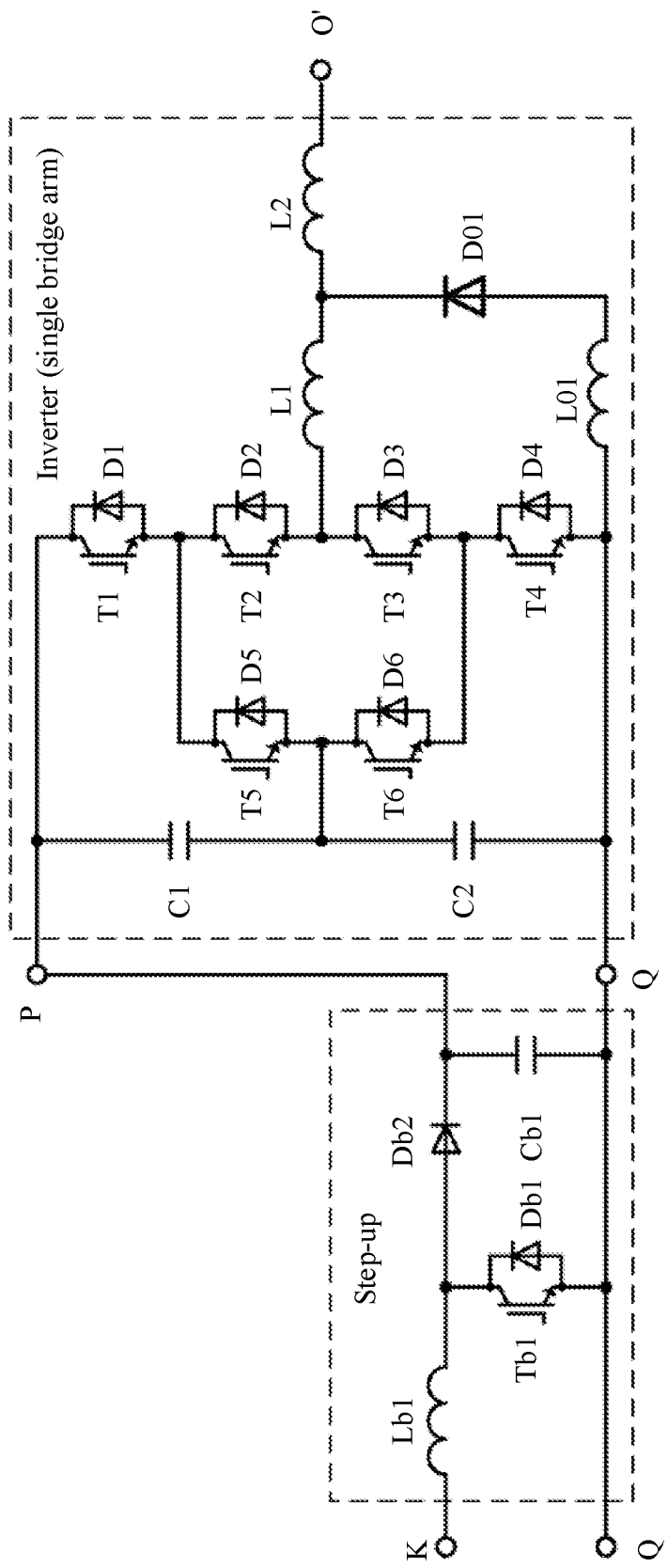
FIG. 12 is a schematic diagram of a structure of a power conversion circuit according to a tenth embodiment of this application.

FIG. 12 is a schematic diagram of a structure of a power conversion circuit according to a tenth embodiment of this application. As shown in FIG. 12, on the basis of the power conversion circuit shown in FIG. 4, in addition to the capacitors: C1 and C2 shown in FIG. 8 and the first filter inductor L1, the second filter inductor L2, and the third inductor L01 shown in FIG. 9, the power conversion circuit further includes a step-up circuit. The step-up circuit includes a fourth inductor Lb1, a fifth diode Db2, an eleventh switching component Tb1/Db1, and a third capacitor Cb1. An output positive end of the step-up circuit is connected to the input positive end P of the first bridge arm, and an output negative end of the step-up circuit is connected to the input negative end Q of the first bridge arm. The third capacitor Cb1 is connected to the output positive end and the output negative end of the step-up circuit. One end of the fourth inductor Lb1 is connected to an input positive end K of the step-up circuit, and the other end is connected to an anode of the fifth diode Db2. A cathode of the fifth diode Db2 is connected to the output positive end of the step-up circuit. A first end of a switching transistor Tb1 of the eleventh switching component Tb1/Db1 is connected between the fourth inductor Lb1 and the fifth diode Db2, and a second end is connected to the input negative end of the step-up circuit. In this case, because the diode Db2 is connected in reverse directions to a diode D1 of the switching component T1/D1 and the diode D2 of the switching component T2/D2, no short-circuit loop is formed, and no short-circuit current is generated. A diode D3 of the switching component T3/D3 and a diode D4 of the switching component T4/D4 may form a short-circuit loop. Therefore, the first lower bridge arm may be connected in parallel to the unilateral conduction component such as the diode D01. In this case, when the foregoing loop is formed, the diode D01 shares a current in the diode D3 and a current in the diode D4.

Figure 13:
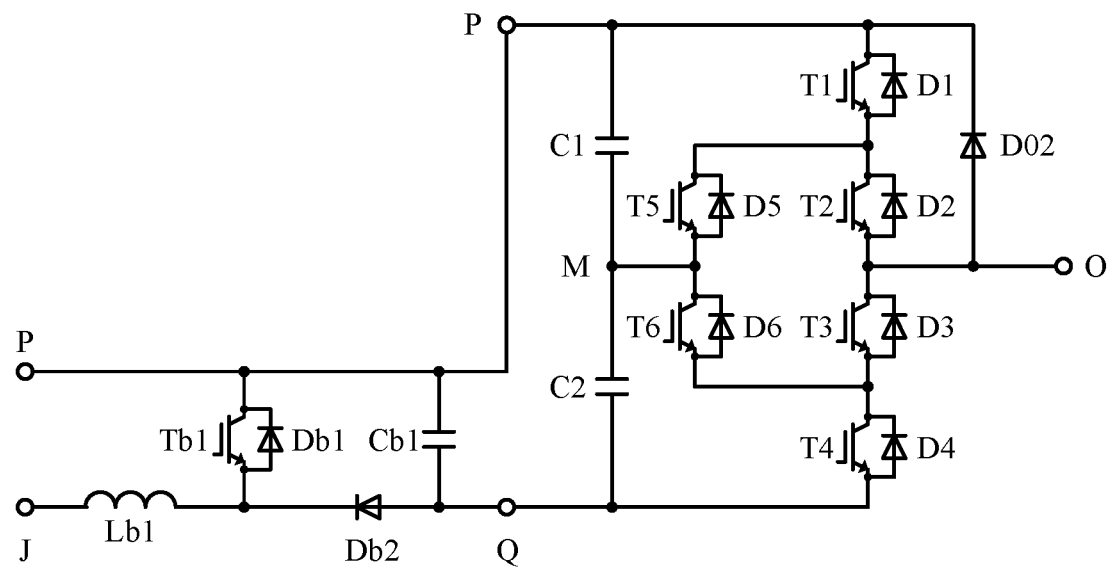
FIG. 13 is a schematic diagram of a structure of a power conversion circuit according to an eleventh embodiment of this application.

FIG. 13 is a schematic diagram of a structure of a power conversion circuit according to an eleventh embodiment of this application. A difference from the power conversion circuit shown in FIG. 12 that in the power conversion circuit shown in FIG. 13, one end of the fourth inductor Lb1 is connected to an input negative end J of the step-up circuit, and the other end is connected to the cathode of the fifth diode Db2, the anode of the fifth diode Db2 is connected to the output negative end of the step-up circuit, the first end of the switching transistor Tb1 of the eleventh switch device Tb1/Db1 is connected to the input positive end of the step-up circuit, and the second end is connected between the fourth inductor Lb1 and the fifth diode Db2. Therefore, when an external cable of the input negative end J of the step-up circuit is accidentally short circuited to the ground, because the diode Db2 is connected in reverse directions to the diode D3 of the switching component T3/D3 and the diode D4 of the switching component T4/D4, no short-circuit loop is formed, and no short-circuit current is generated. An input positive end P of an inverter circuit is directly electrically connected to the output positive end and the input positive end of the step-up circuit. A diode D1 of a switching component T1/D1 and a diode D2 of a switching component T2/D2 may form a short-circuit loop. Therefore, the first upper bridge arm may be connected in parallel to the unilateral conduction component such as the diode D02. In this case, when the foregoing loop is formed, the diode D02 shares a current in the diode D1 and a current in the diode D2.

In conclusion, the solutions in this application are applicable to a single phase of circuit/three phases of circuits with various topology structures. In an active neutral point clamped (ANPC) circuit topology, for example, a single diode or at least two diodes may be additionally configured, which is similar to a bypass function, to alleviate an impact on a switching operation of a semiconductor component.

Figure 14:
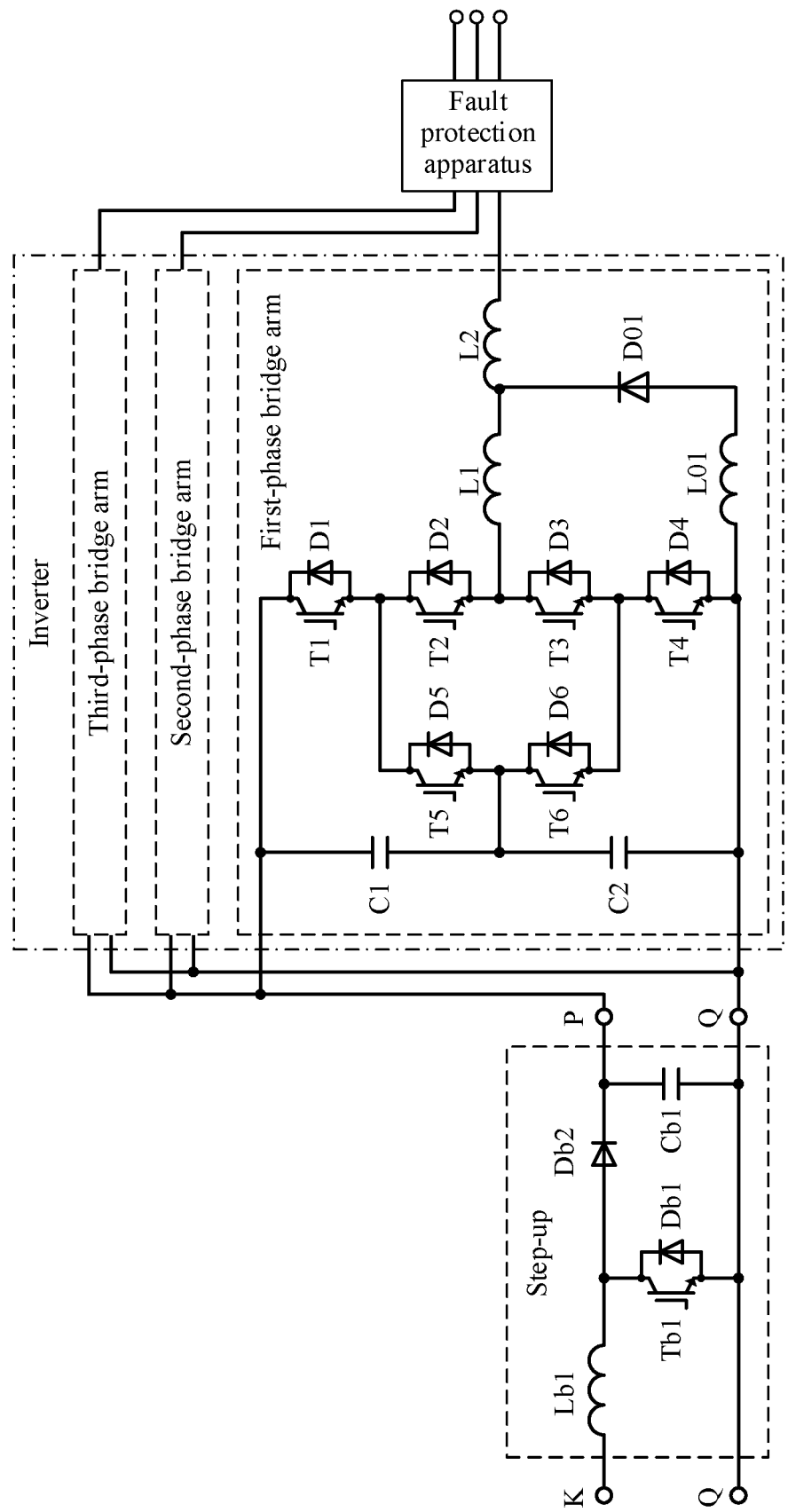
FIG. 14 is a schematic diagram of a structure of a power transmission system according to an embodiment of this application.

FIG. 14 is a schematic diagram of a structure of a power transmission system according to an embodiment of this application. As shown in FIG. 14, the power transmission system includes a fault protection apparatus and the foregoing power conversion circuit. The fault protection apparatus is coupled to an output end of the power conversion circuit. An input positive end K and an input negative end Q of the power conversion circuit are configured to connect to a device providing power, for example, a photovoltaic panel described below. The fault protection apparatus is configured to disconnect a circuit when the power conversion circuit is faulty.

Figure 15A:
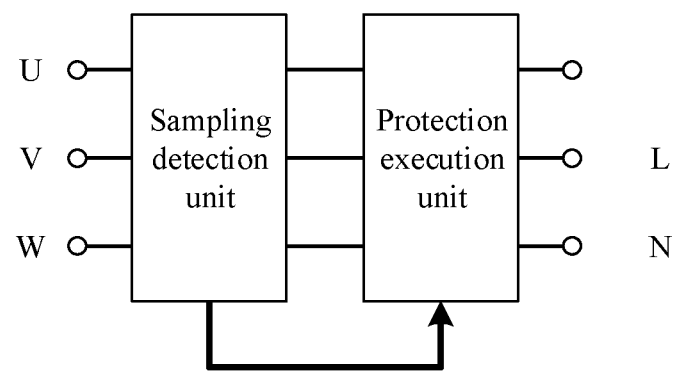
FIG. 15A is a schematic diagram of a structure of a fault protection apparatus in three phases of circuits in a power transmission system according to an embodiment of this application.
Figure 15B:
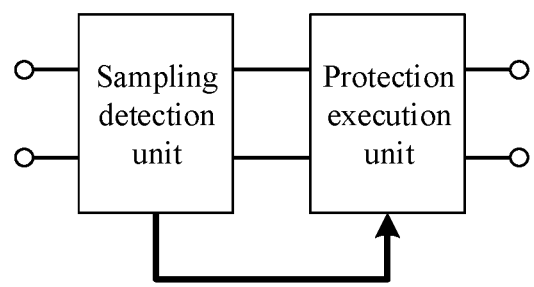
FIG. 15B is a schematic diagram of a structure of a fault protection apparatus in a single phase of circuit in a power transmission system according to an embodiment of this application.

FIG. 15A is a schematic diagram of a structure of a fault protection apparatus in three phases of circuits in a power transmission system according to an embodiment of this application. As shown in FIG. 15A, three cables of the three phases of circuits: U, V, and W all pass through a sampling detection unit. When the three phases of circuits: U, V, and W are grounded normally, currents flowing through the three cables are balanced. In this case, the sampling detection unit detects that a circuit is in a normal state, and a protection execution unit does not perform an operation. When the three phases of circuits: U, V, and W are grounded abnormally, currents flowing through the three cables are imbalanced. In this case, the sampling detection unit detects that a circuit is in an abnormal state, and controls a protection execution unit to perform an operation and disconnect the three phases of circuits: U, V, and W. FIG. 15B is a schematic diagram of a structure of a fault protection apparatus in a single phase of circuit in a power transmission system according to an embodiment of this application. As shown in FIG. 15B, two cables of single phases of circuits: L and N both pass through a sampling detection unit. When the single phases of circuits: L and N are grounded normally, currents flowing through the two cables are balanced. In this case, the sampling detection unit detects that a circuit is in a normal state, and a protection execution unit does not perform an operation. When the single phases of circuits: L and N are grounded abnormally, currents flowing through the two cables are imbalanced. In this case, the sampling detection unit detects that a circuit is in an abnormal state, and controls a protection execution unit to perform an operation and disconnect the single phases of circuits: L and N. The protection execution unit may include a mechanical switch, such as a relay or a semiconductor switch. When the protection execution unit performs an operation, the mechanical switch is disconnected, or the semiconductor switch is disconnected, to prevent a corresponding cable from forming a loop and prevent a corresponding cable from circulating a current.

Figures 16A, 16B:
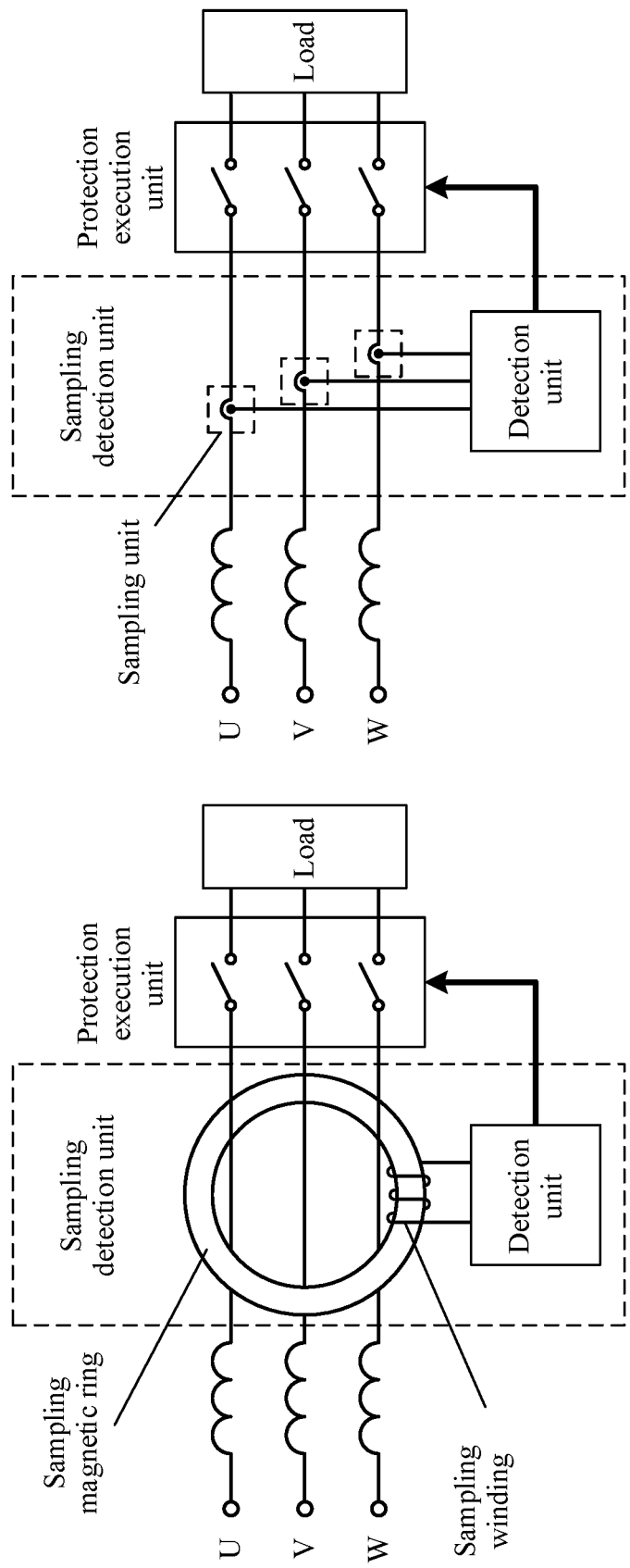
FIG. 16A is a schematic diagram of an embodiment of the fault protection apparatus shown in FIG. 15A.
FIG. 16B is a schematic diagram of another embodiment of the fault protection apparatus shown in FIG. 15A.

FIG. 16A is a schematic diagram of an embodiment of the fault protection apparatus shown in FIG. 15A. As shown in FIG. 15A and FIG. 16A, the fault protection apparatus includes a sampling detection unit and a protection execution unit. The protection execution unit is connected to an output end of the power conversion circuit by using a connection conductor. The sampling detection unit includes a sampling unit coupled to the connection conductor and a detection unit connected to the sampling unit. The detection unit is connected to the protection execution unit. When the detection unit detects an abnormal current in the connection conductor, the protection execution unit is controlled to disconnect the circuit. In FIG. 16A, the sampling unit includes a sampling magnetic ring and a sampling winding wound around the sampling magnetic ring. The sampling winding is connected to the detection unit. The connection conductors such as three cables of three phases of circuits: U, V, and W all pass through the sampling magnetic ring. The protection execution unit may include three groups of relays respectively connected to the three cables. In FIG. 16A, the connection conductor is a cable. It may be understood that the connection conductor may alternatively be another proper structure, for example, a copper foil on a printed circuit board.

FIG. 16B is a schematic diagram of another embodiment of the fault protection apparatus shown in FIG. 15A. As shown in FIG. 16B, a difference from the fault protection apparatus shown in FIG. 16A is that the detection unit is connected to three current sampling circuits, and the three current sampling circuits are respectively coupled to three cables of three phases of circuits: U, V, and W in one-to-one correspondence by using one sampling unit. The sampling unit may be a sampling magnetic ring and a sampling winding wound around the sampling magnetic ring. The sampling winding is connected to the current sampling circuit. In FIG. 16B, three cables respectively pass through different sampling magnetic rings. In FIG. 16A, three cables pass through the same sampling magnetic ring. In other words, as shown in FIG. 16A, the three cables of the three phases of circuits: U, V, and W may be coupled to the same sampling unit. Alternatively, as shown in FIG. 16B, the three cables of the three phases of circuits: U, V, and W may be respectively coupled to different sampling units.

In FIG. 16A and FIG. 16B, when the three phases of circuits: U, V, and W are grounded normally, the currents flowing through the three cables are balanced. The detection unit detects, through the sampling winding or the three current sampling circuits, that the circuit is in the normal state, and the relay remains closed. When the three phases of circuits: U, V, and W are grounded abnormally, the currents flowing through the three cables are imbalanced. The detection unit detects, through the sampling winding or the three current sampling circuits, that a current in the connection conductor is abnormal, that is, the circuit is in an abnormal state. The protection execution unit is controlled to disconnect the circuit, that is, the three groups of relays are controlled to be disconnected.

The sampling detection unit samples a current at an output end of a bridge power conversion circuit. When the sampling detection unit detects that the currents are imbalanced, the sampling detection unit may send a first protection signal. When the protection execution unit receives the first protection signal, the protection execution unit disconnects the connection conductor such as a cable connected to the output end of the power conversion circuit. Because a capability of the circuit for bearing the short-circuit current when the circuit is abnormally grounded is improved, the fault protection apparatus is allowed to use a component with a relatively long sampling detection delay time and a mechanical switching component or a semiconductor switching component with a relatively long circuit disconnection time, thereby simplifying a circuit design and reducing the costs of the fault protection apparatus. In addition, in the power transmission system of this application, the fault protection apparatus may disconnect a circuit at a zero crossing point of the current, which can reduce a risk of damaging the fault protection apparatus.

Figure 17:
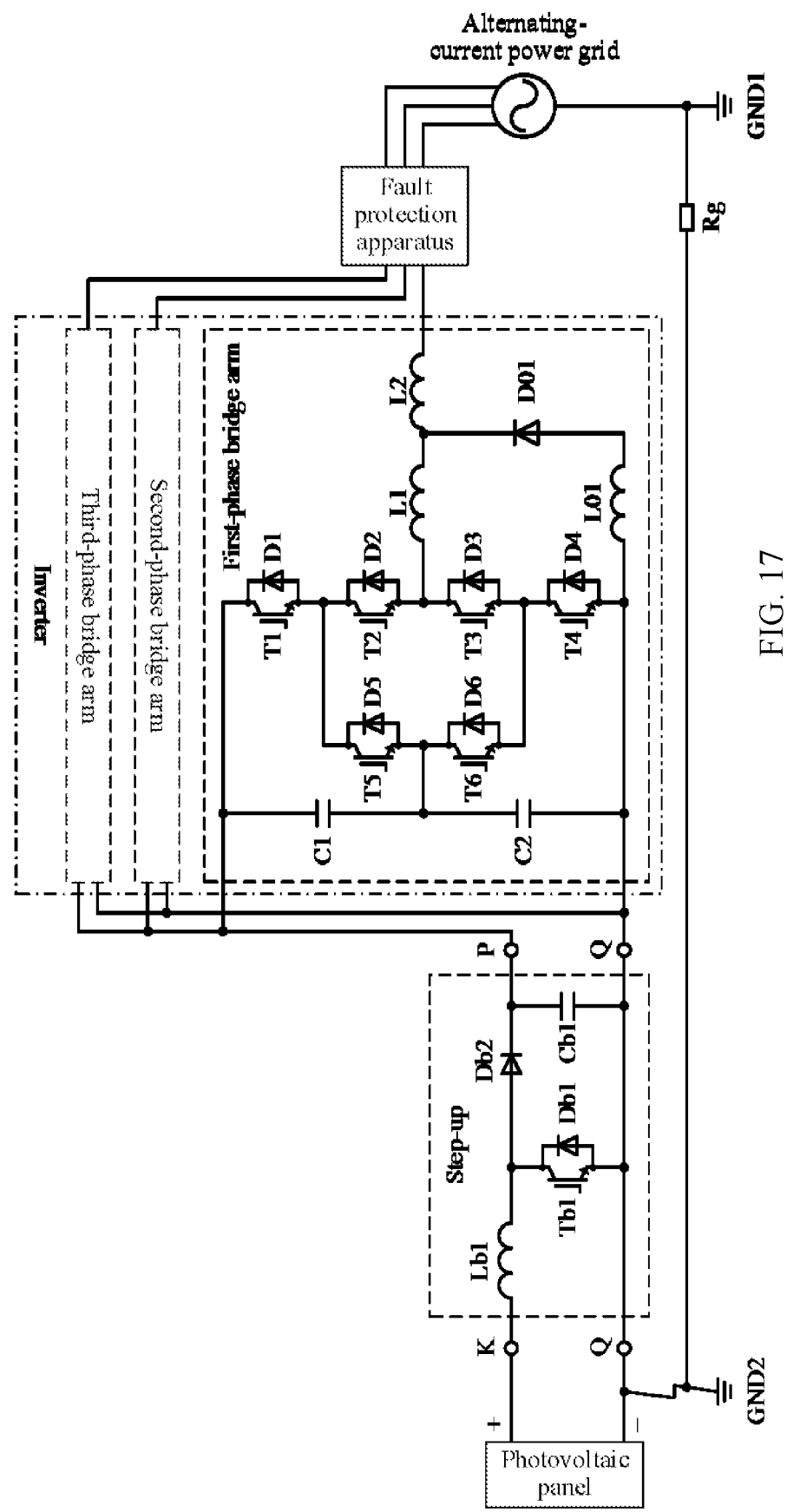
FIG. 17 is a schematic diagram of a structure of a photovoltaic device according to an embodiment of this application.

FIG. 17 is a schematic diagram of a structure of a photovoltaic device according to an embodiment of this application. As shown in FIG. 17, the photovoltaic device includes an alternating-current power grid, a photovoltaic panel serving as a device providing power, and the foregoing power transmission system. An input positive end of a power conversion circuit of the power transmission system is connected to a positive electrode of the photovoltaic panel. An input negative end of the power conversion circuit is connected to a negative electrode of the photovoltaic panel. The alternating-current power grid is connected to the fault protection apparatus. The alternating-current power grid is grounded.

In this application, unilateral conduction components such as diodes: D01 and D02 are additionally connected in parallel to a circuit topology. In this way, when the system is abnormally grounded, a short-circuit current partly flows through the diodes in additional parallel connection, to improve a capability of the circuit for bearing the short-circuit current, protect a diode of a switching component in an original circuit topology, and reduce a risk of damaging a semiconductor component, thereby improving reliability of the system and implementing a simple structure and a relatively small impact on an original circuit structure. In addition, a higher capability of the circuit for bearing the short-circuit current allows the fault protection apparatus to have a larger response speed range, so that the fault protection apparatus can use a more concise design.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A power conversion circuit, comprising:
   a first bridge arm, the first bridge arm comprising a first upper bridge arm and a first lower bridge arm, the first upper bridge arm comprises an upper switching component connected between an input positive end and an output end, the first lower bridge arm comprises a lower switching component connected between the output end and an input negative end, the upper and lower switching components comprise a switching transistor and a first diode anti-parallel connected to the switching transistor, a first end of an upper switching transistor of the first upper bridge arm is connected to the input positive end and a second end is connected to the output end, and a first end of a lower switching transistor of the first lower bridge arm is connected to the output end and a second end is connected to the input negative end; and
   a unilateral conduction component, wherein one or both of the first upper bridge arm and the first lower bridge arm is/are separately connected in parallel to the unilateral conduction component, and a conduction direction of the unilateral conduction component is the same as a conduction direction of the first diode of the switching component of the first bridge arm, to at least divide an abnormal current flowing through the first diode when a fault occurs.

2. The power conversion circuit according to claim 1, wherein the unilateral conduction component comprises one second diode or at least two second diodes, one group of switching components in switching components of one or both of the first upper bridge arm and the first lower bridge arm are connected in parallel to one group of second diodes, each group of switching components comprise one switching component or at least two switching components connected in series, and each group of second diodes comprise one second diode or at least two second diodes connected in series.

3. The power conversion circuit according to claim 1, wherein the power conversion circuit further comprises a first filter inductor connected between the output end of the first bridge arm and an output end of the power conversion circuit, and one end of the unilateral conduction component is connected to the input positive end or the input negative end, and the other end is connected to the output end of the power conversion circuit.

4. The power conversion circuit according to claim 3, wherein the power conversion circuit further comprises a second filter inductor, the second filter inductor is connected between the first filter inductor and the output end of the power conversion circuit, and the other end of the unilateral conduction component is connected between the first filter inductor and the second filter inductor.

5. The power conversion circuit according to claim 3, wherein the first bridge arm further comprises a third inductor connected in series to the unilateral conduction component; and
   one end of the third inductor is connected to the input negative end, and the other end is connected to an anode of the unilateral conduction component; or
   the one end of the third inductor is connected to the input positive end, and the other end is connected to a cathode of the unilateral conduction component.

6. The power conversion circuit according to claim 5, wherein the power conversion circuit is three phases of circuits;
   the unilateral conduction components connected in parallel to the first upper bridge arms of the three phases of circuits are connected to the same third inductor; or
   the unilateral conduction components connected in parallel to the first lower bridge arms of the three phases of circuits are all connected to the same third inductor.

7. The power conversion circuit according to claim 1, wherein the first upper bridge arm comprises a first switching component and a second switching component that are connected in series, and the first lower bridge arm comprises a third switching component and a fourth switching component that are connected in series;
   the first bridge arm further comprises a fifth switching component and a sixth switching component, a first end of a switching transistor of the fifth switching component is connected between the first switching component and the second switching component, a second end of a switching transistor of the sixth switching component is connected between the third switching component and the fourth switching component, and a second end of the switching transistor of the fifth switching component and a first end of the switching transistor of the sixth switching component are connected to an input reference end; and the first bridge arm further comprises a third diode and a fourth diode, a cathode of the third diode is connected between the first switching component and the second switching component, an anode of the fourth diode is connected between the third switching component and the fourth switching component, and an anode of the third diode and a cathode of the fourth diode are connected to an input reference end.

8. The power conversion circuit according to claim 1, wherein the first bridge arm further comprises a seventh switching component and an eighth switching component; and
- a first end of a switching transistor of the seventh switching component is connected to the input reference end, a first end of a switching transistor of the eighth switching component is connected to the output end of the first bridge arm, and a second end of the switching transistor of the seventh switching component is connected to a second end of the switching transistor of the eighth switching component; or
- the second end of the switching transistor of the seventh switching component is connected to the input reference end, a second end of a switching transistor of the eighth switching component is connected to the output end of the first bridge arm, and the first end of the switching transistor of the seventh switching component is connected to the first end of the switching transistor of the eighth switching component.

9. The power conversion circuit according to claim 7, wherein the first bridge arm further comprises a first capacitor and a second capacitor that are connected in series between the input positive end and the input negative end, and the input reference end is located between the first capacitor and the second capacitor.

10. The power conversion circuit according to claim 1, wherein the output end of the first bridge arm is an output live wire end, the power conversion circuit further comprises a second bridge arm, the second bridge arm comprises a second upper bridge arm and a second lower bridge arm, the second upper bridge arm comprises another switching component connected between the input positive end and an output neutral wire end, the second lower bridge arm comprises another switching component connected between the output neutral wire end and the input negative end, a first end of a switching transistor of the second upper bridge arm is connected to the input positive end and a second end is connected to the output neutral wire end, and a first end of a switching transistor of the second lower bridge arm is connected to the output neutral wire end and a second end is connected to the input negative end.

11. The power conversion circuit according to claim 10, wherein the power conversion circuit further comprises a ninth switching component and a tenth switching component;
- a first end of a switching transistor of the ninth switching component is connected to the output neutral wire end, a first end of a switching transistor of the tenth switching component is connected to the output live wire end, and a second end of the switching transistor of the ninth switching component is connected to a second end of the switching transistor of the tenth switching component; or
- the second end of the switching transistor of the ninth switching component is connected to the output neutral wire end, the second end of the switching transistor of the tenth switching component is connected to the output live wire end, and the first end of the switching transistor of the ninth switching component is connected to the first end of the switching transistor of the tenth switching component.

12. The power conversion circuit according to claim 1, wherein
- the switching transistor is a metal oxide semiconductor field-effect transistor (MOSFET); a first end of the switching transistor is a drain and a second end of the switching transistor is a source, and the first diode is a body diode of the MOSFET; or
- the switching transistor is an insulated gate bipolar transistor (IGBT), the first end of the switching transistor is a collector, and the second end of the switching transistor is an emitter.

13. The power conversion circuit according to claim 1, wherein the power conversion circuit further comprises a step-up circuit; the step-up circuit comprises a fourth inductor, a fifth diode, an eleventh switching component, and a third capacitor, an output positive end of the step-up circuit is connected to the input positive end of the first bridge arm and an output negative end of the step-up circuit is connected to the input negative end of the first bridge arm, and the third capacitor is connected to the output positive end and the output negative end of the step-up circuit; and
- one end of the fourth inductor is connected to an input positive end of the step-up circuit, and the other end is connected to an anode of the fifth diode, a cathode of the fifth diode is connected to the output positive end of the step-up circuit, a first end of a switching transistor of the eleventh switching component is connected between the fourth inductor and the fifth diode and a second end is connected to the input negative end, and the first lower bridge arm of the first bridge arm is connected in parallel to the unilateral conduction component; or
- the one end of the fourth inductor is connected to the input negative end of the step-up circuit and the other end is connected to the cathode of the fifth diode, the anode of the fifth diode is connected to the output negative end of the step-up circuit, the first end of the switching transistor of the eleventh switching component is connected to the input positive end and a second end is connected between the fourth inductor and the fifth diode, and the first upper bridge arm of the first bridge arm is connected in parallel to the unilateral conduction component.

14. A power transmission system, comprising:
a power conversion circuit comprising:
- a first bridge arm, the first bridge arm comprising a first upper bridge arm and a first lower bridge arm, the first upper bridge arm comprises an upper switching component connected between an input positive end and an output end, the first lower bridge arm comprises a lower switching component connected between the output end and an input negative end, the upper and lower switching components comprise a switching transistor and a first diode anti-parallel connected to the switching transistor, a first end of an upper switching transistor of the first upper bridge arm is connected to the input positive end and a second end is connected to the output end, and a first end of a lower switching transistor of the first lower bridge arm is connected to the output end and a second end is connected to the input negative end; and
- a unilateral conduction component, wherein one or both of the first upper bridge arm and the first lower bridge arm is/are separately connected in parallel to the unilateral conduction component, and a conduction direction of the unilateral conduction component is the same as a conduction direction of the first diode of the switching component of the first bridge arm, to at least divide an abnormal current flowing through the first diode when a fault occurs, a fault protection apparatus, the fault protection apparatus is coupled to an output end of the power conversion circuit, an input positive end and an input negative end of the power conversion circuit are configured to connect to a device providing power, and the fault protection apparatus is configured to disconnect a circuit when the power conversion circuit is faulty.

15. The power transmission system according to claim 14, wherein the fault protection apparatus comprises a sampling detection unit and a protection execution unit; the protection execution unit is connected to an output end of the power conversion circuit by using a connection conductor; the sampling detection unit comprises a sampling unit coupled to the connection conductor and a detection unit connected to the sampling unit; the detection unit is connected to the protection execution unit; and when the detection unit detects an abnormal current in the connection conductor, the protection execution unit is controlled to disconnect the circuit.

16. The power transmission system according to claim 14, wherein the fault protection apparatus disconnects the circuit at a zero crossing point of the current.

17. A photovoltaic device, comprising:
an alternating-current power grid;
a photovoltaic panel serving as a device providing power; and
a power transmission system comprising:
a power conversion circuit comprising:
    a first bridge arm, the first bridge arm comprising a first upper bridge arm and a first lower bridge arm, the first upper bridge arm comprises an upper switching component connected between an input positive end and an output end, the first lower bridge arm comprises a lower switching component connected between the output end and an input negative end, the upper and lower switching components comprise a switching transistor and a first diode anti-parallel connected to the switching transistor, a first end of an upper switching transistor of the first upper bridge arm is connected to the input positive end and a second end is connected to the output end, and a first end of a lower switching transistor of the first lower bridge arm is connected to the output end and a second end is connected to the input negative end; and
a unilateral conduction component, wherein one or both of the first upper bridge arm and the first lower bridge arm is/are separately connected in parallel to the unilateral conduction component, and a conduction direction of the unilateral conduction component is the same as a conduction direction of the first diode of the switching component of the first bridge arm, to at least divide an abnormal current flowing through the first diode when a fault occurs, a fault protection apparatus, the fault protection apparatus is coupled to an output end of the power conversion circuit, an input positive end and an input negative end of the power conversion circuit are configured to connect to a device providing power, and the fault protection apparatus is configured to disconnect a circuit when the power conversion circuit is faulty, the input positive end of the power conversion circuit of the power transmission system is connected to a positive electrode of the photovoltaic panel, the input negative end of the power conversion circuit is connected to a negative electrode of the photovoltaic panel, the alternating-current power grid is connected to the fault protection apparatus; and the alternating-current power grid is grounded.

\* \* \* \* \*